(No Model.) 2 Sheets—Sheet 1.

L. BELL.
SYSTEM OF ELECTRICAL DISTRIBUTION.

No. 427,541. Patented May 13, 1890.

Witnesses
E. D. Smith
Thomas Durant

Inventor
Louis Bell
By his Attorneys
Clunch & Clunch (No Model.) 2 Sheets—Sheet 2.
L. BELL.
SYSTEM OF ELECTRICAL DISTRIBUTION.
No. 427,541. Patented May 13, 1890.
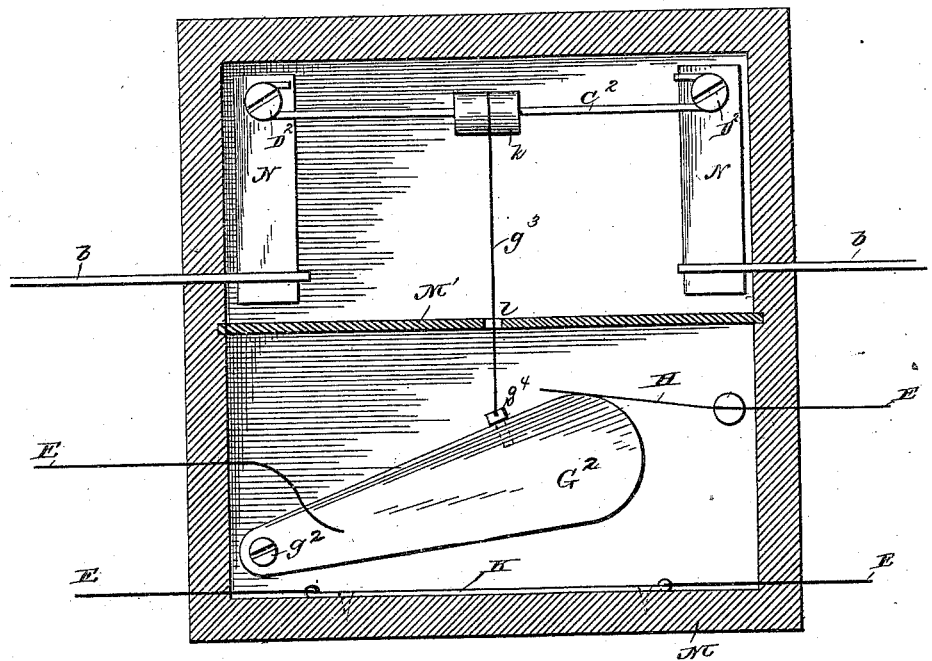
Witnesses
Inventor
Louis Bell
By his Attorneys

UNITED STATES PATENT OFFICE.

LOUIS BELL, OF LAFAYETTE, INDIANA.

SYSTEM OF ELECTRICAL DISTRIBUTION.

SPECIFICATION forming part of Letters Patent No. 427,541, dated May 13, 1890.

Application filed November 7, 1889. Serial No. 329,535. (No model.)

*To all whom it may concern:*

Be it known that I, LOUIS BELL, of Lafayette, in the county of Tippecanoe and State of Indiana, have invented certain new and useful Improvements in Systems of Electrical Distribution; and I do hereby declare the following to be a full, clear, and exact description of the same, reference being had to the accompanying drawings, forming a part of this specification, and to the figures and letters of reference marked thereon.

My invention relates to improvements in that class of systems of electrical distribution for electric railroads in which a trolley or brush attached to a movable vehicle takes current from an uninsulated wire or bar kept at approximately constant potential by a dynamo-electric generator or other source of electricity.

The objects of the improvement are, first, to avoid the dangers and inconveniences arising from the short-circuiting of said wire or bar with the earth or other conductor; second, to give notice of time and approximate place of such a short circuit, so that it may be readily reached and remedied; to which ends it consists in certain novel details in construction and combinations and arrangements of the parts, as will be hereinafter described, and pointed out particularly in the claims at the end of this specification.

Figure 1:
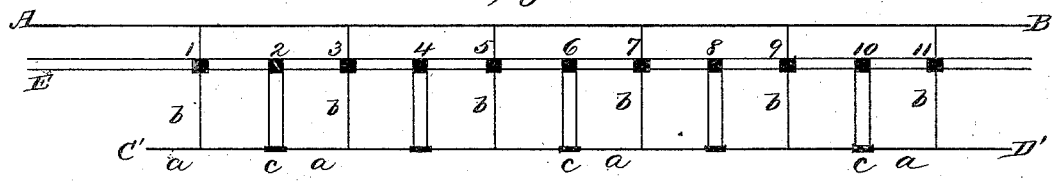
Figure 2:
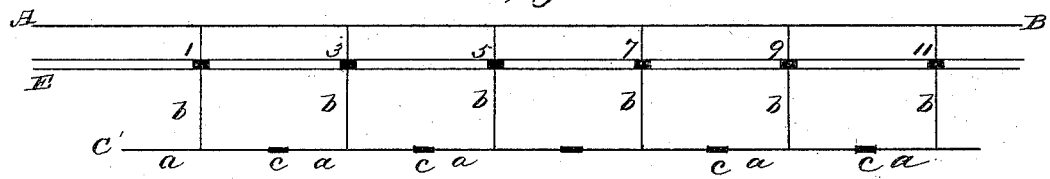
Figure 3:
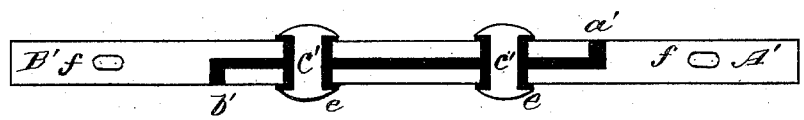
Figure 4:
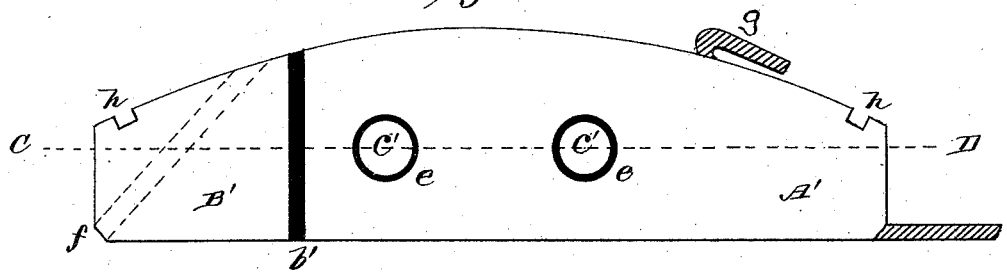

In the accompanying drawings, Figure 1 shows the arrangement of the wires forming the conducting system for lines where high conductivity is required. Fig. 2 shows a simpler arrangement of the same sort for use on short lines or where a lower conductivity is sufficient. Fig. 3 is a horizontal section of section-junction on line C D, Fig. 4, showing method of insulation. Fig. 4 is an elevation of the insulating section-junction, which preferably forms a part of this system. Fig. 5 is a detail of one of the junction-boxes.

Similar letters in the several figures denote the same parts.

In Fig. 1 the contact wire or bar constituting the distributing-conductor C' D' is divided into sections $a$ $a$, &c., preferably mechanically connected, but electrically insulated from each other at the section-junctions $c$ $c$, &c., and each section is in communication by a feed-wire $b$ with a source of electricity, preferably by being attached to a common main feed-wire A B, in connection with the source of supply. At each section-junction $c$ wires are electrically connected with the ends of the contiguous sections and carried to one of the junction-boxes 2 4 6 8 10, where they are joined through a safety-fuse, or other current-limiting device, to be presently described.

Each of the feed-wires $b$ is carried to one of the junction-boxes 1 3 5 7 9 11, and there connected with the source of electricity through a similar current-limiting device. All the junction-boxes are in electrical communication with a central station, and the operation of the current-limiting device in any box will send an appropriate signal to said central station. I prefer to accomplish this by passing the simple independent circuit E through each box and so arrange the current-limiting devices that the operation of any one of them will close the circuit E at that box.

The preferred form of junction-box and current-limiting device is illustrated in Fig. 5, wherein it will be seen that a box or casing M is provided, within which is located a partition M', of slate or other insulating material having a central aperture $i$. In the upper compartment so formed two metal blocks N are secured, one at each side, with which the terminals of the feed-wire $b$ are respectively in electrical connection, a fusible wire or strip $c^2$ serving to connect the blocks and complete the connection. Screws $D^2$ may be employed to secure the strip or wire in place. The terminals of the signal-circuit E extend into the lower compartment, one wire of the circuit being in connection with a plate K, fastened to the bottom of the case and nickeled or otherwise provided with a good contact-surface. A latch or weighted drop $G^2$, pivoted at $g^2$ immediately above the plate K, is connected permanently with one terminal of the other signal-circuit wire and makes contact with a spring H, forming the other terminal, but adapted when lowered to break contact with H and establish the circuit through plate K. The weighted latch is held in elevated position by a cord or wire $g^3$, secured thereto by a screw $g^4$, and supported by an insulator $k$ on the fusible wire or strip $c^2$. Thus, when the fusible wire melts the latch drops and completes the signal-circuit.

The location of the box may be determined by any of the ordinary testing means commonly employed to locate a fault, or any ordinary signaling device may be operated by the latch.

The system operates in the following manner: Each of the current-limiting devices is arranged to break circuit if the current passing through it exceeds a certain amount. I prefer that this amount should be smaller for the current-limiting devices in the contact-wire than for those in the feed-wires. If, then, the contact-wire should break and be grounded the safety device in the junction-box adjacent to the grounded end would cut off the current from the grounded section and at the same time close the circuit E, giving warning of the accident at the central station and enabling the ground to be located in its proper section. More than one safety device may operate in some cases; but only the section where the short circuit occurs will be cut out, and thus the working of the rest of the system will not be interfered with. By making the sections, say, one thousand feet in length, the place of the short circuit may be conveniently located. In Fig. 2 the same system is arranged in a somewhat simpler manner, the letters and figures referring to the same parts as in Fig. 1, from which it only differs in omitting the current-limiting devices in the line of the contact-wire. The sections $a$ $a$ are consequently insulated from each other, except for the feed-wires $b$ $b$, &c., in which are the current-limiting devices. The operation is the same as in Fig. 1, except that no more than one safety device can operate for a single short circuit, and that section will be at once cut out and a signal sent to the central station, as before.

In Fig. 3 is shown the device for mechanically connecting the sections, at the same time leaving them insulated from each other at the points of junction. Two metallic strips A B, shaped substantially as shown, are lapped upon each other, being separated by the insulating material $a$ $b$ and held firmly together by the two bolts or rivets $c$ $c$, insulated from both strips by the insulating-washers $e$ $e$. Each strip is perforated by a hole $f$, for the reception of the end of the contact-wire. In Fig. 4 is shown the elevation of the same section-junction with the strips A' B', the insulation showing at $b'$ the rivets $c'$ $c'$ passing through the insulating-washers $e$ $e$ and the oblique hole $f$ for their reception of the end of the contact-wire. At $g$ the wire is shown in position. $h$ $h$ are transverse notches to facilitate the fastening of the wires leading to the junction-box. This arrangement insulates the sections and at the same time gives continuous electrical contact of the trolley or brush.

I am aware that prior to my invention systems of electrical distribution have been devised which include a contact wire or bar divided into sections mechanically continuous, but electrically discontinuous. I therefore do not claim such an arrangement broadly; but, What I do claim as my invention, and desire to secure by Letters Patent, is—

1. In a power system of electric distribution, the combination, with a distributing-conductor divided into sections with current-limiting devices between each section, of an independent connection between each section and the source of supply, with a current-limiting device in each of said connections, substantially as described.

2. In a power system of electric distribution, the combination, with a distributing-conductor divided into sections with current-limiting devices between each section, of a main conductor communicating with the source of supply, an independent connection between said main conductor and each section, and a current-limiting device interposed in each of said connections.

3. In a power system of electric distribution for tramways, the combination, with the uninsulated distributing-conductor divided into sections united mechanically, and an electric connection between adjacent sections with current-limiting devices located in said connections, of an independent connection, with a current-limiting device therein, between each of said sections and the source of supply, substantially as described.

4. In a power system of electric distribution, the combination, with the distributing-conductor divided into sections, with an independent connection between each section and the source of supply, of a signal-circuit extending from each section to a central station, and a signal-operating mechanism included in said section, substantially as described.

5. In a power system of electric distribution, the combination, with the distributing-conductor divided into sections, with an independent connection between each section and the source of supply, and a current-limiting device located in each of said connections, of a signal-circuit between the current-limiting devices and a central station, substantially as described.

6. In a power system of electric distribution, the combination, with the distributing-conductor divided into sections, with current-limiting devices between each section, an independent connection between each section and the source of supply with current-limiting devices located therein, of a signal-circuit connecting the current-limiting devices and a central station, substantially as described.

7. In a system of electrical distribution, the combination, with the suspended distributing-conductor divided into sections, of the terminal connection for uniting adjacent sections, consisting of the overlapping plates mechanically connected together, but electrically insulated from each other, and means for securing the terminals of the conductors to said plates, substantially as described.

<div style="text-align:right">LOUIS BELL.</div>

Witnesses:
    Jos. W. Wilstach,
    Flora Perkins.